US012300140B2

(12) United States Patent
Kim et al.

(10) Patent No.: US 12,300,140 B2
(45) Date of Patent: May 13, 2025

(54) DATA PROCESSING DEVICE, DATA DRIVING DEVICE FOR SETTING A HIGH TRANSMISSION RATE ENVIRONMENT

(71) Applicant: SILICON WORKS CO., LTD., Daejeon (KR)

(72) Inventors: Do Seok Kim, Daejeon (KR); Yong Hwan Mun, Daejeon (KR); Myung Yu Kim, Daejeon (KR); Hyun Pyo Cho, Daejeon (KR)

(73) Assignee: SILICON WORKS CO., LTD., Daejeon (KR)

( * ) Notice: Subject to any disclaimer, the term of this patent is extended or adjusted under 35 U.S.C. 154(b) by 0 days.

(21) Appl. No.: 18/506,251

(22) Filed: Nov. 10, 2023

(65) Prior Publication Data

US 2024/0078950 A1 Mar. 7, 2024

Related U.S. Application Data

(63) Continuation of application No. 17/979,747, filed on Nov. 2, 2022, now Pat. No. 11,948,488, which is a continuation of application No. 17/319,980, filed on May 13, 2021, now Pat. No. 11,521,532.

(30) Foreign Application Priority Data

May 25, 2020 (KR) ........................ 10-2020-0062423

(51) Int. Cl.
*G09G 3/20* (2006.01)

(52) U.S. Cl.
CPC ....... *G09G 3/20* (2013.01); *G09G 2310/0275* (2013.01); *G09G 2370/08* (2013.01)

(58) Field of Classification Search
CPC ........................................................ G09G 3/20
See application file for complete search history.

(56) References Cited

U.S. PATENT DOCUMENTS

| | | | |
|---|---|---|---|
| 10,692,458 B2 | 6/2020 | Pyun et al. | |
| 10,825,416 B2 | 11/2020 | Pyun et al. | |
| 10,923,074 B2 | 2/2021 | Pyun et al. | |
| 11,183,145 B2 | 11/2021 | Kim et al. | |
| 2003/0147461 A1 | 8/2003 | Abrosimov et al. | |
| 2018/0114480 A1* | 4/2018 | Kuroiwa ................ | G09G 5/395 |

(Continued)

FOREIGN PATENT DOCUMENTS

| | | |
|---|---|---|
| KR | 10-2019-0014274 A | 2/2019 |
| KR | 10-2019-0123832 A | 11/2019 |

(Continued)

OTHER PUBLICATIONS

Request for the Submission of an Opinion issued for the corresponding Korean patent application 10-2020-0062423, on Mar. 21, 2024, 14 pages.

*Primary Examiner* — Gustavo Polo
(74) *Attorney, Agent, or Firm* — Birch, Stewart, Kolasch & Birch, LLP

(57) ABSTRACT

The present disclosure relates to a data driving device, a data processing device, and a system for driving a display device and, more particularly, it relates to a data driving device, a data processing device, and a system for smoothly performing a low-speed communication through a communication line including an alternating current coupling capacitor.

14 Claims, 8 Drawing Sheets

(56) References Cited

U.S. PATENT DOCUMENTS

| | | | |
|---|---|---|---|
| 2019/0197987 | A1 | 6/2019 | Kim et al. |
| 2019/0325843 | A1 | 10/2019 | Pyun et al. |
| 2019/0392778 | A1 | 12/2019 | Pyun et al. |
| 2020/0090616 | A1 | 3/2020 | Duan et al. |
| 2020/0161377 | A1 | 5/2020 | Aggarwal et al. |

FOREIGN PATENT DOCUMENTS

| | | | |
|---|---|---|---|
| KR | 10-2020-000008 | A | 1/2020 |
| KR | 10-2020-0045230 | A | 5/2020 |

* cited by examiner

DATA PROCESSING DEVICE, DATA DRIVING DEVICE FOR SETTING A HIGH TRANSMISSION RATE ENVIRONMENT

CROSS REFERENCE TO RELATED APPLICATION

This application is a continuation application of U.S. patent application Ser. No. 17/979,747 filed on Nov. 2, 2022, which is a continuation application of U.S. patent application Ser. No. 17/319,980 filed on May 13, 2021, now U.S. Pat. No. 11,521,532, which claims priority from Republic of Korea Patent Application No. 10-2020-0062423, filed on May 25, 2020, all of which are hereby incorporated by references in their entirety.

BACKGROUND

1. Field of Technology

The present disclosure relates to a technology for driving a display device.

2. Description of the Prior Art

A display device generally comprises a display panel to display an image and a timing controller, a source driver, and a gate driver to drive the display panel. The display panel comprises a plurality of gate lines, a plurality of data lines, and a plurality of pixels. The source driver outputs data signals to the data lines and the gate driver outputs gate signals to drive the gate lines. The timing controller may control the source driver and the gate driver.

In such a display device, an image is displayed by the gate driver applying a gate signal of a gate on voltage level to a gate line, and then, the source driver supplying a data signal corresponding to an image signal to a data line.

The timing controller and the source driver are connected through signal lines. In order that a signal transmitted from the timing controller is stably recovered in the source driver, the level of a common mode voltage of the signal transmitted from the timing controller must conform to the level of a common mode voltage of a signal processing circuit inside the source driver. However, since a data transmission rate increases due to the enlargement of a display panel and the increase of the data transmission rate leads to an increase of a communication speed, the level of a common mode voltage of a signal transmitted from the timing controller may differ from the level of a common mode voltage of the signal processing circuit inside the source driver.

Here, if an alternating current coupling capacitor (AC coupling capacitor) is connected to a communication line, it is possible to minimize a direct current (DC) element in a signal transmitted from the timing controller so that a difference between the levels of common mode voltages may be removed.

As described above, a communication line comprising an AC coupling capacitor may allow establishing an environment for a high-speed communication between the timing controller and the source driver.

Meanwhile, the timing controller and the source driver may set up an environment for the high-speed communication by performing a low-speed communication before performing the high-speed communication.

In the low-speed communication with the timing controller, the source driver may perceive bits in a signal using two kinds of voltage levels, positive (+) and negative (−).

Conventionally, when generating a high-speed communication signal and a low-speed communication signal, the timing controller encodes the high-speed communication signal and the low-speed communication signal using a general code such as a Non-Return-to-Zero (NRZ) code as shown in FIG. 8A and FIG. 8B.

Since an AC coupling capacitor connected to a communication line is designed for a high-speed communication, a source driver may smoothly process a high-speed communication signal encoded using a general code in a high-speed communication.

However, in a low-speed communication, the source driver may not smoothly process a low-speed communication signal encoded using a general code.

For example, in a case when a low-speed communication signal includes data bits corresponding to a binary numeral "0" respectively alternating with data bits corresponding to a binary numeral "1", since the low-speed communication signal encoded using a general code has alternations of a negative (−) voltage level and a positive (+) voltage level as shown in FIG. 8A, the source driver may normally perceive the data bits of the low-speed communication signal.

However, in a case when a low-speed communication signal includes a continuation of at least two data bits corresponding to the binary numeral "0" or to the binary numeral "1", the low-speed communication signal encoded using the general code may include a part where the voltage level is not changed, but maintained, which corresponds to the continuation of at least two identical data bits. As the length of the part, where the identical data bits continue, becomes longer, the probability, in which the source driver may not perceive the data bits in the part, increases and this may lead to an abnormal perception of the data bits of the low-speed communication signal.

SUMMARY OF THE INVENTION

In this background, an aspect of the present invention is to provide a technology for smoothly performing a low-speed communication through a communication line comprising an alternating current coupling capacitor in a display device.

To this end, in an aspect, the present disclosure provides a system comprising: a communication line comprising at least one alternating current (AC) coupling capacitor; a data processing device, connected to one end of the communication line, to transmit a configuration data signal encoded using a direct current (DC) balance code in a low-speed communication to the communication line and subsequently to perform a high-speed communication; and a data driving device, connected to the other end of the communication line, to receive the configuration data signal from the communication line, to decode the configuration data signal into configuration data using the DC balance code, to set up a high-speed communication environment according to the configuration data and to perform a high-speed communication with the data processing device.

The DC balance code may comprise a Manchester code.

The configuration data signal may include multiple pieces of data, each piece comprising header data, body data, and checksum data and may further include a start bit disposed before the multiple pieces of data and an end bit disposed after the multiple pieces of data.

The data processing device may transmit a preamble signal encoded using the Manchester code to the data driving device through the communication line before transmitting the configuration signal to the data driving device through the communication line. The preamble signal may be a signal in which the Manchester code, which corresponds to any one binary numeral, repeats N (N is a natural number equal to or higher than 2) times.

The communication line may comprise a first line comprising a first alternating current coupling capacitor and a second line comprising a second alternating current coupling capacitor.

The first line may further comprise a third alternating current coupling capacitor. The first alternating current coupling capacitor may be disposed to be adjacent to the data processing device and the third alternating current coupling capacitor may be disposed to be adjacent to the data driving device in the first line.

The second line may further comprise a fourth alternating current coupling capacitor. The second alternating current coupling capacitor may be disposed to be adjacent to the data processing device and the fourth alternating current coupling capacitor may be disposed to be adjacent to the data driving device in the second line.

The DC balance code may comprise an 8B10B code.

The configuration data signal may include multiple pieces of data, each piece comprising a start symbol, header data, body data, and checksum data and further include an end symbol disposed after the multiple pieces of data.

The start symbol and the end symbol may respectively comprise comma bit strings.

The data processing device may transmit a preamble signal encoded using an 8B10B code through the communication line to the data driving device before transmitting the configuration data signal through the communication line to the data driving device. The preamble signal may be a signal in which data bits, respectively corresponding to a binary numeral "1" and a binary numeral "0", regularly appear such that their appearance numbers are balanced with each other.

In another aspect, the present disclosure provides a data driving device comprising: a receiving circuit, connected with a communication line comprising at least one alternating current (AC) coupling capacitor, to receive a configuration data signal encoded using a direct current (DC) balance code through the communication line in a low-speed communication; a decoder to receive the configuration data signal from the receiving circuit, to decode the configuration signal using the DC balance code into configuration data, and to output it; and a control circuit, when power is applied thereto, to activate the receiving circuit and the decoder so as to perform the low-speed communication through the communication line, to set up a high-speed communication environment according to the configuration data outputted from the decoder, and to perform a high-speed communication through the communication line.

The configuration data may comprise a gain level of an equalizer for the high-speed communication.

The control circuit may deactivate the receiving circuit and the decoder when performing the high-speed communication.

In still another aspect, the present disclosure provides a data processing device comprising: a control circuit to generate configuration data for setting up a high-speed communication environment of a receiving side and to generate a configuration data signal including the configuration data by encoding the configuration data into the configuration data signal using a direct current (DC) balance code; and a transmitting circuit, connected with a communication line comprising at least one alternating current coupling capacitor, to transmit the configuration data signal through the communication line to the receiving side in a low-speed communication.

The control circuit may generate a preamble signal in which a Manchester code, corresponding to any one binary numeral, is repeated N (N is a natural number equal to or higher than 2) times before transmitting the configuration data signal and the transmitting circuit may transmit the preamble signal through the communication line in the low-speed communication.

As described above, according to the present disclosure, a low-speed protocol signal is encoded using a DC balance code in a display device and this may allow minimizing communication errors due to an alternating current capacitor of a communication line in a low-speed communication of the display device.

BRIEF DESCRIPTION OF THE DRAWINGS

The above and other aspects, features, and advantages of the present disclosure will be more apparent from the following detailed description taken in conjunction with the accompanying drawings, in which.

DETAILED DESCRIPTION OF THE EXEMPLARY EMBODIMENTS

Figure 1:
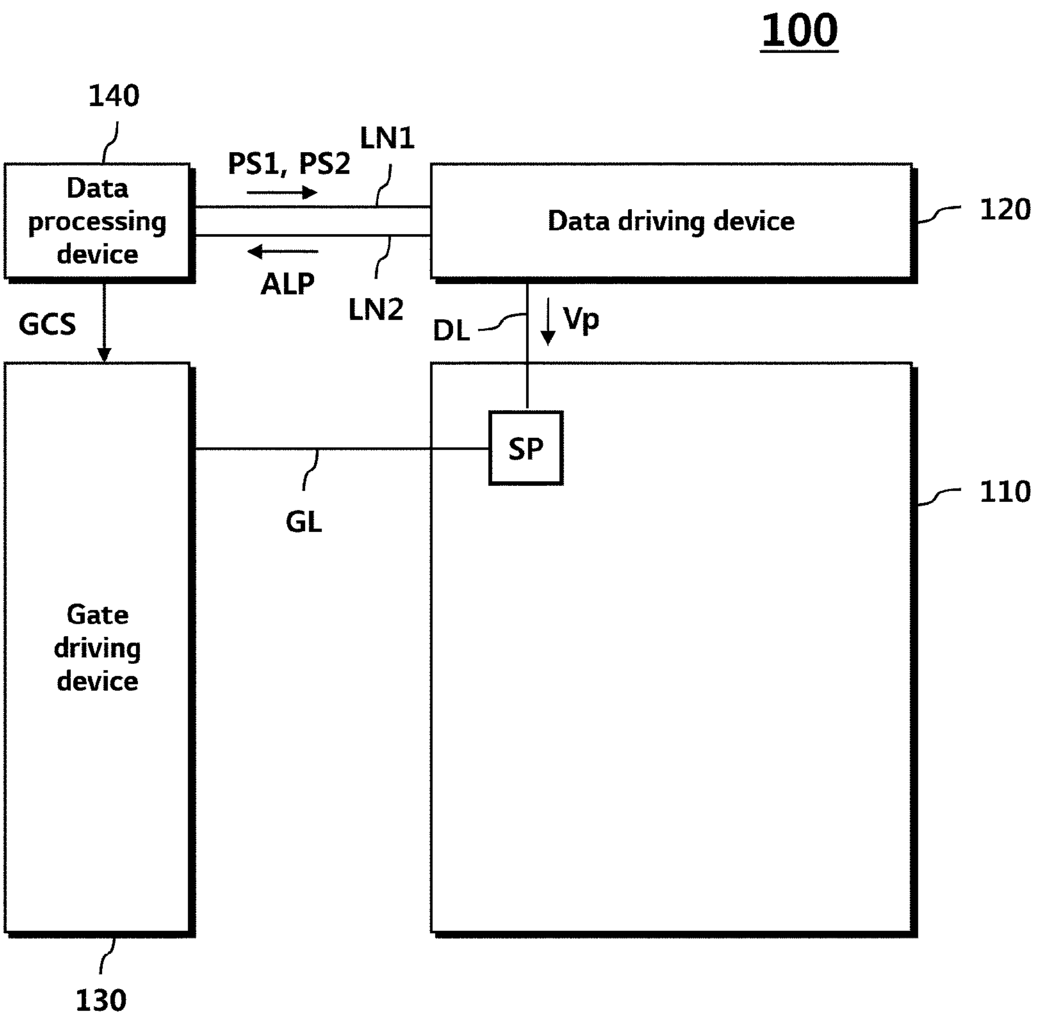
FIG. 1 is a configuration diagram of a display device according to an embodiment.

FIG. 1 is a configuration diagram of a display device according to an embodiment.

Referring to FIG. 1, a display device 100 may comprise a display panel 110, a data driving device 120, a gate driving device 130, and a data processing device 140.

On the display panel 110, a plurality of data lines DL and a plurality of gate lines GL may be disposed and a plurality of pixels may also be disposed. A pixel may comprise a plurality of sub-pixels SP. Sub-pixels may be a red (R) sub-pixel, a green (G) sub-pixel, a blue (B) sub-pixel, and a white (W) sub-pixel. A pixel may comprise RGB sub-pixels SP, RGBG sub-pixels SP, or RGBW sub-pixels SP. For the convenience of description, hereinafter, the description will be made supposing that a pixel comprises RGB sub-pixels.

The data driving device 120, the gate driving device 130, and the data processing device 140 are to generate signals for displaying images on the display panel 110.

The gate driving device 130 may supply a gate driving signal, such as a turn-on voltage or a turn-off voltage, through a gate line GL. When a gate driving signal of a turn-on voltage is supplied to a sub-pixel SP, the sub-pixel SP is connected with a data line DL. When a gate driving signal of a turn-off voltage is supplied to the sub-pixel SP, the sub-pixel SP is disconnected from the data line DL. The gate driving device 130 may be referred to as a gate driver.

The data driving device 120 may supply a data voltage Vp to a sub-pixel SP through a data line DL. A data voltage Vp supplied through a data line DL may be supplied to a sub-pixel SP according to a gate driving signal. The data driving device 120 may be referred to as a source driver.

The data driving device 120 may comprise at least one integrated circuit, and this at least one integrated circuit may be connected to a bonding pad of a display panel 110 in a tape automated bonding (TAB) method or a chip-on-glass (COG) method, directly formed on a display panel 110, or integrated on a display panel 110 depending on a case. In addition, a data driving device 120 may be formed in a chip-on-film (COF) type.

The data processing device 140 may supply control signals to the gate driving device 130 and the data driving device 120. For example, the data processing device 140 may transmit a gate control signal GCS to initiate a scan to the gate driving device 130, output an image data signal to the data driving device 120, and transmit a data control signal DCS to control the data driving device 120 to supply a data voltage Vp to each sub-pixel SP. The data processing device 140 may be referred to as a timing controller.

According to an embodiment, when driving voltages VCC are supplied to the data processing device 140 and the data driving device 120, a low-speed communication between the data processing device 140 and the data driving device 120 may be performed through a first communication line LN1. After the low-speed communication, a high-speed communication may be performed through the first communication line LN1.

This will be described in detail hereinafter.

Figure 2A:
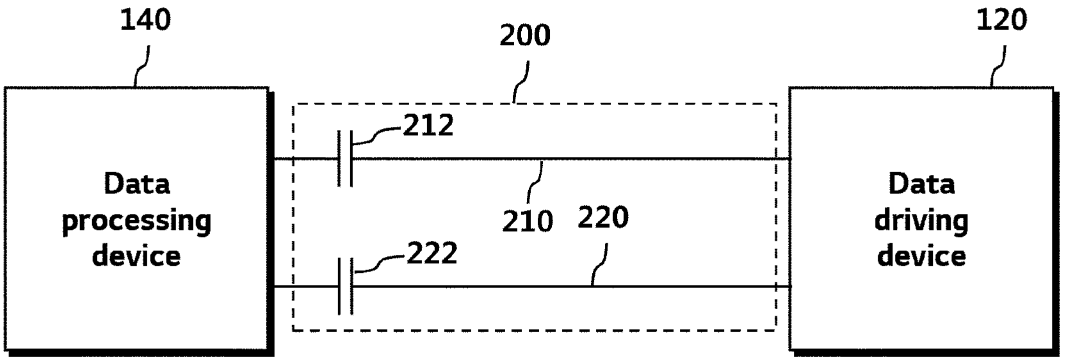
FIG. 2A and FIG. 2B are configuration diagrams of a system according to an embodiment.
Figure 2B:
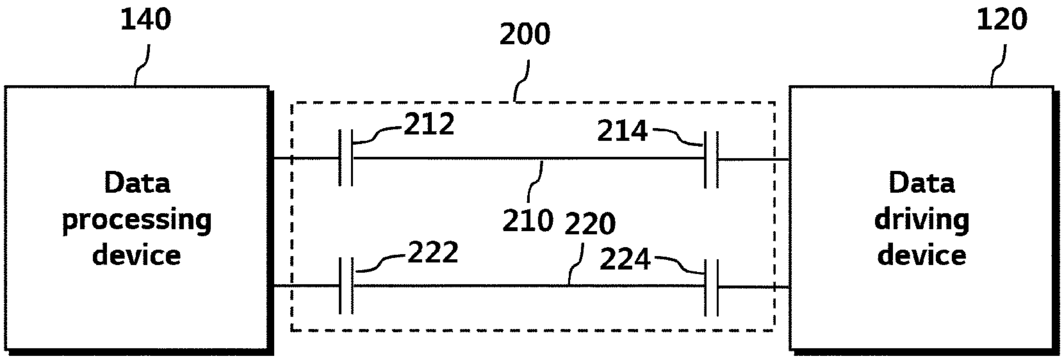
Figure 3:
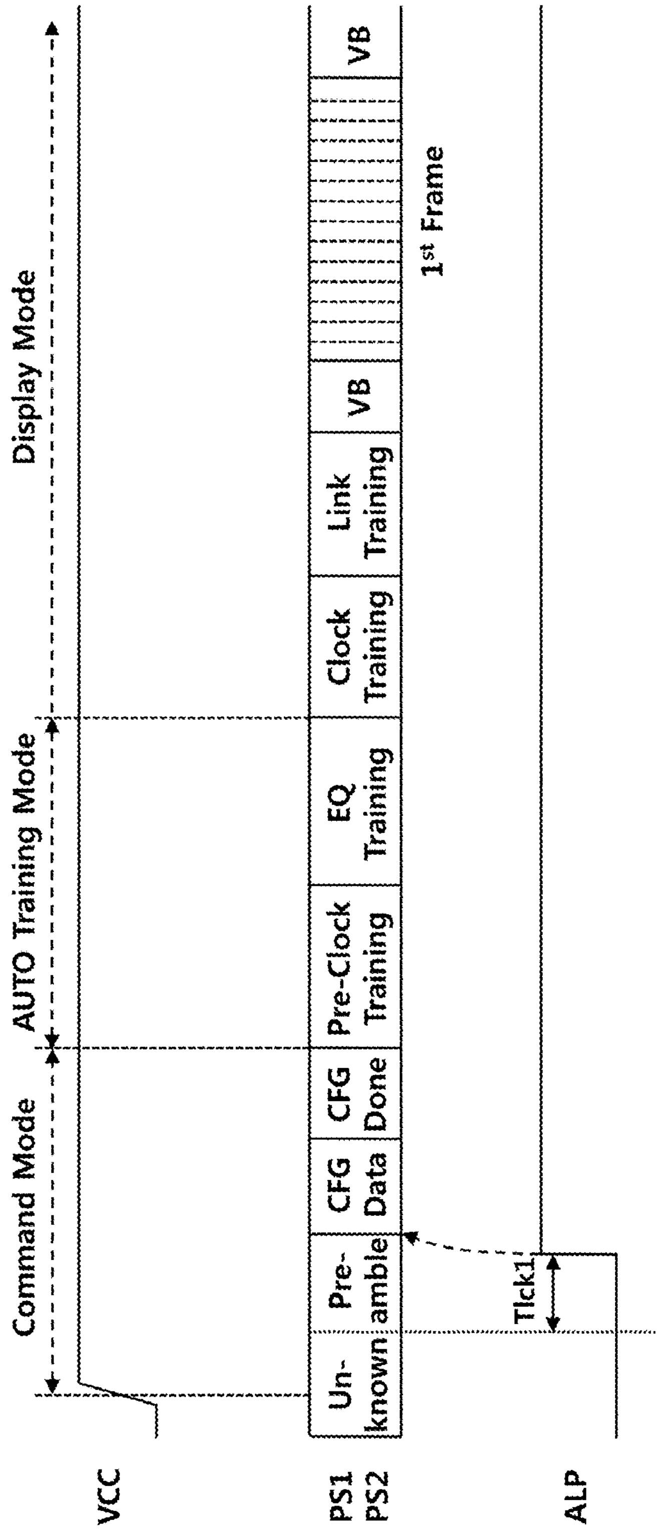
FIG. 3 is a diagram illustrating a signal sequence between a data processing device and a data driving device according to an embodiment.

FIG. 2A and FIG. 2B are configuration diagrams of a system according to an embodiment and FIG. 3 is a diagram illustrating a signal sequence between a data processing device and a data driving device according to an embodiment.

A first communication line (LN1) 200 may comprise at least one alternating current coupling capacitor 212, 222 as shown in FIG. 2A. Specifically, the first communication line (LN1) 200 may comprise a first line 210 comprising a first alternating current coupling capacitor 212 and a second line 220 comprising a second alternating current capacitor 222.

The first line 210 may further comprise a third alternating current coupling capacitor 214 and the second line 220 may further comprise a fourth alternating current coupling capacitor 224 as shown in FIG. 2B.

In a case when the first line 210 further comprises the third alternating current coupling capacitor 214, the first alternating current coupling capacitor 212 may be disposed to be adjacent to the data processing device 140 and the third alternating current coupling capacitor 214 may be disposed to be adjacent to the data driving device 120 in the first line 210.

In a case when the second line 220 further comprises the fourth alternating current coupling capacitor 224, the second alternating current coupling capacitor 222 may be disposed to be adjacent to the data processing device 140 and the fourth alternating current coupling capacitor 224 may be disposed to be adjacent to the data driving device 120 in the second line 220.

The addition of the third alternating current coupling capacitor 214 and the fourth alternating current coupling capacitor 224 respectively to the first line 210 and the second line 220 may allow an additional improvement of the reception performance of the data driving device 120 in the low-speed communication.

The data processing device 140 may be connected to one end of the first communication line (LN1) 200 and the data driving device 120 may be connected to the other end of the first communication line (LN1) 200. In other words, the data processing device 140 and the data driving device 120 may communicate with each other through the first communication line (LN1) 200.

When driving voltages VCC are supplied to the data processing device 140 and the data driving device 120 in a state where the data processing device 140 and the data driving device 120 are connected with each other through the first communication line (LN1) 200, the data processing device 140 and the data driving device 120 may perform the low-speed communication through the first communication line (LN1) 200 during a predetermined time (for example, during a time of a command mode in FIG. 3). After a predetermined time has elapsed (for example, from an auto training mode in FIG. 3), the data processing device 140 and the data driving device 120 may perform a high-speed communication. Here, a frequency of the high-speed communication may be more than 10 times higher than a frequency of the low-speed communication.

Meanwhile, in the high-speed communication, a data loss rate may greatly differ or a communication may not be smoothly performed depending on a configuration of the data driving device 120, which is a receiving side.

According to an embodiment, before a high-speed communication between the data processing device 140 and the data driving device 120 is performed, a receiving side configuration data for a smooth high-speed communication may be transmitted to the data driving device 120 using a low-speed protocol signal PS2 corresponding to a low-speed communication. The reason is that a data loss rate does not greatly differ depending on the configuration of the data driving device 120 in the low-speed communication, and therefore, the receiving side configuration data may be transmitted relatively correctly to the data driving device 120.

According to an embodiment, before transmitting a high-speed protocol signal PS1 corresponding to the high-speed communication, the data processing device 140 may transmit a low-speed protocol signal PS2 including receiving side configuration data.

Here, the data processing device 140 may encode the low-speed protocol signal PS2 using a direct current (DC) balance code.

The reason is that, when a low-speed protocol signal PS2 is encoded using a DC balance code, data may be modulated such that binary numerals “0” and “1” appear at a similar frequency in a long section of the low-speed protocol signal PS2. Such a modulation leads to a state in which there is no section where data is constant or such a section is short and this may allow reducing transmission errors due to at least one alternating current coupling capacitor 212, 222 comprised in the first communication line (LN1) 200.

According to an embodiment, the DC balance code may comprise a Manchester code or an 8B10B code.

Figure 4A:
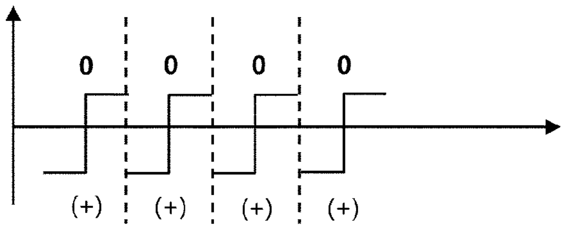
FIG. 4A and FIG. 4B are diagrams illustrating a Manchester code.
Figure 4B:
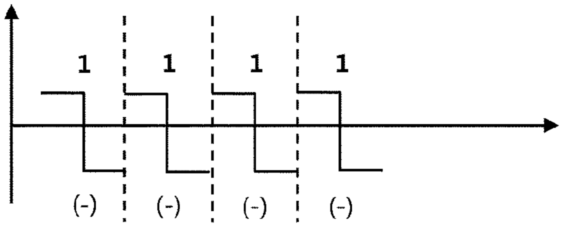

When using the Manchester code, a voltage level may be changed in a middle position of every data bit as shown in FIG. 4A and FIG. 4B. For example, even if data bits corresponding to the binary numeral “0” are repeated, as shown in FIG. 4A or data bits corresponding to the binary numeral “1” are repeated, as shown in FIG. 4B, the voltage level may be changed in a middle position of every data bit.

Accordingly, the data driving device 120 may perceive repeated changes of voltage levels and this may allow the data driving device 120 to correctly perceive the repeated data bits.

When using the 8B10B code, the number of repetition of data bits corresponding to the binary numeral "1" or the binary numeral "0" may be minimized (for example, a maximum of 4). Therefore, the decrease of the perception rate of the data driving device 120 for the repeated data bits may be minimized.

Meanwhile, a time section where the data processing device 140 transmits the low-speed protocol signal PS2 (for example, a command mode section in FIG. 3) may comprise a preamble section, a CFG data section, and a CFG done section as shown in FIG. 3.

In the preamble section, the low-speed protocol signal PS2 may include a preamble signal which is a low-speed communication clock signal. Here, the data processing device 140 may encode the preamble signal using the DC balance code.

Figure 5A:
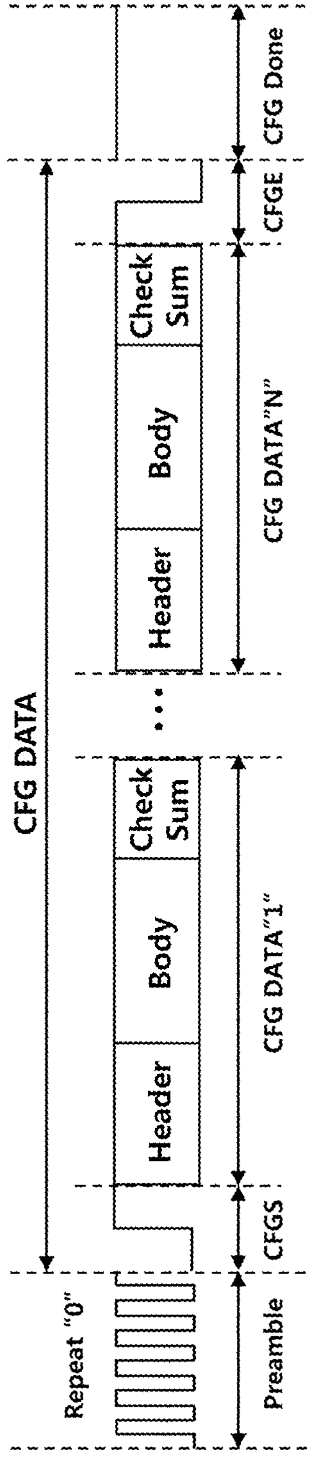
FIG. 5A and FIG. 5B are timing diagrams of a low-speed communication section according to an embodiment.

In a case when the DC balance code is the Manchester code, the preamble signal may be a signal in which the Manchester code corresponding to either the binary numeral "1" or the binary numeral "0" may be repeated N (N is a natural number equal to or greater than 2) times. For example, in a case when the Manchester code corresponding to the binary numeral "0" is repeated N times, the preamble signal may have a general clock pattern, as shown in FIG. 5A and the data driving device 120 may train a clock for the low-speed communication using the preamble signal.

In a case when the DC balance code is the 8B10B code, the preamble signal may be a signal in which data bits corresponding to the binary numeral "1" and data bits corresponding to the binary numeral "0" may regularly appear such that their appearance numbers are balanced with each other. For example, the preamble signal may be a signal in which data bits corresponding to the binary numeral "1" and data bits corresponding to the binary numeral "0" may repeatedly alternate with each other.

Figure 5B:
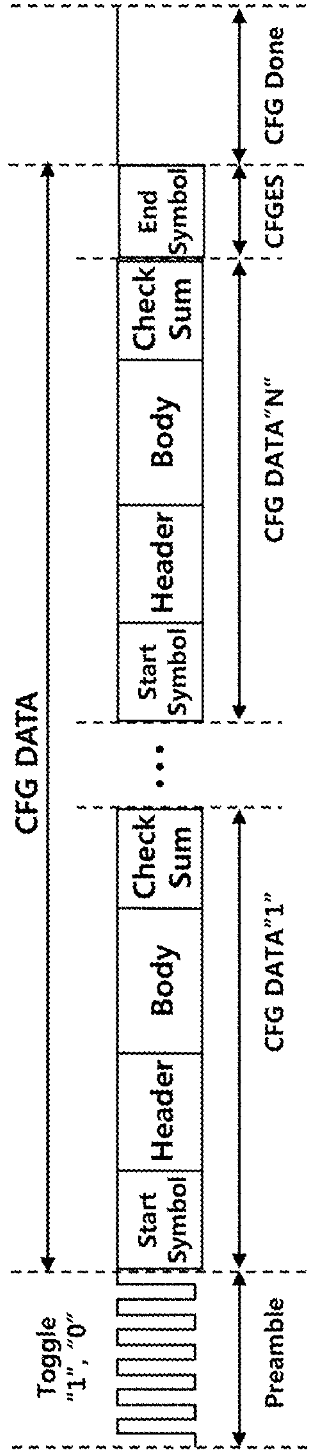

In a case when data bits corresponding to the binary numeral "1" and data bits corresponding to the binary numeral "0" may regularly appear such that their appearance numbers are balanced with each other, the preamble signal may have a general clock pattern as shown in FIG. 5B and the data driving device 120 may train a clock for the low-speed communication using the preamble signal.

Meanwhile, the low-speed protocol signal (PS2) may include receiving side configuration data in the CFG data section. The data driving device 120 may receive the low-speed protocol signal PS2 using the clock for the low-speed communication in the CFG data section. Hereinafter, the low-speed protocol signal PS2 transmitted or received in the CFG data section will be referred to as a receiving side configuration data signal.

In a case when a receiving side configuration data signal CFG DATA is encoded using the Manchester code, the receiving side configuration data signal CFG DATA may include multiple pieces of configuration data CFG DATA "1" to CFG DATA "N", each piece comprising header data, body data, and checksum data and may further include a start bit CFGS disposed before the multiple pieces of configuration data CFG DATA "1" to CFG DATA "N" and an end bit CFGE disposed after the multiple pieces of configuration data CFG DATA "1" to CFG DATA "N" as shown in FIG. 5A. Here, the start bit CFGS and the end bit CFGE may respectively comprise different data bits. For example, if the start bit CFGS is a data bit corresponding to the binary numeral "0", the end bit CFGE may be a data bit corresponding to the binary numeral "1".

In a case when a receiving side configuration data signal CFG DATA is encoded using the 8B10B code, the receiving side configuration data signal CFG DATA may include multiple pieces of configuration data CFG DATA "1" to CFG DATA "N", each piece comprising a start symbol, header data, body data, and checksum data and may further include an end symbol disposed after the multiple pieces of configuration data CFG DATA "1" to CFG DATA "N" as shown in FIG. 5B. Here, a start symbol comprised in each of the multiple pieces of configuration data CFG DATA "1" to CFG DATA "N" and the end symbol disposed after the multiple pieces of configuration data CFG DATA "1" to CFG DATA "N" may respectively comprise comma bit strings, each of which is a special bit string for distinguishing between signals. For example, the start symbol may comprise a comma bit string such as "001111" and the end symbol may comprise a comma bit string such as "110000".

After receiving the receiving side configuration data signal, the data driving device 120 may decode the receiving side configuration data signal into receiving side configuration data using the DC balance code. Then, the data driving device 120 may set up a high-speed communication environment according to the receiving side configuration data and perform a high-speed communication with the data processing device 140.

The receiving side configuration data comprising the multiple pieces of configuration data CFG DATA "1" to CFG DATA "N" may include configuration data for the data driving device 120 for the high-speed communication, that is, a gain level of an equalizer, scramble information, line polarity information, or the like. The data driving device 120 may set up circuits for the high-speed communication using the receiving side configuration data. Here, the scramble information may comprise information about whether or not data is scrambled when the data processing device 140 transmits the data to the data driving device 120 and the line polarity information may comprise information indicating the polarity of a first line of a pixel.

In the CFG done section, the second protocol PS2 may comprise a message indicating the end of the low-speed communication. The data driving device 120 may terminate the communication according to the second protocol PS2 by checking this message. Here, the message indicating the end of the low-speed communication may be formed of a signal maintained at a high level or a low level for a predetermined time.

After the CFG done section has passed, the data processing device 140 and the data driving device 120 may perform the high-speed communication through a first communication line (LN1) 200.

Meanwhile, an auxiliary communication signal ALP shown in FIG. 1 may maintain a low level at first and be changed to a high level when a training of a low-speed data communication clock is completed. When being supplied with a driving voltage VCC, the data driving device 120 may maintain the auxiliary communication signal ALP at a low level, and then, change the auxiliary communication signal ALP at a high level when the training of the low-speed communication clock is completed in the preamble section. After the level of the auxiliary communication signal ALP has been changed to be high, the data processing device 140 may transmit the receiving side configuration data signal, which is a low-speed protocol signal PS2. Here, the auxiliary communication signal ALP may be referred to as a lock signal LOCK and transmitted to the data processing device 140 through the second communication line LN2 shown in FIG. 2.

In a case when there is any abnormality in an internal state or an unpredicted communication error occurs after changing the level of the auxiliary communication signal ALP to be high, the data driving device 120 may change the level of the auxiliary communication signal ALP to be low. For example, in a case when the data driving device 120 fails to receive the receiving side configuration data signal or the clock cracks in the CFG data section or the CFG done section, the data driving device 120 may change the level of the auxiliary communication signal ALP to be low.

When the low-speed protocol signal PS2 is maintained at a high level or at a low level for a predetermined time in the CFG done section, the data driving device 120 may initialize a clock training for the low-speed communication and change the level of the auxiliary communication signal ALP from high to low.

Hereinafter, detailed configurations of the data processing device 140 and the data driving device 120 will be described.

Figure 6:
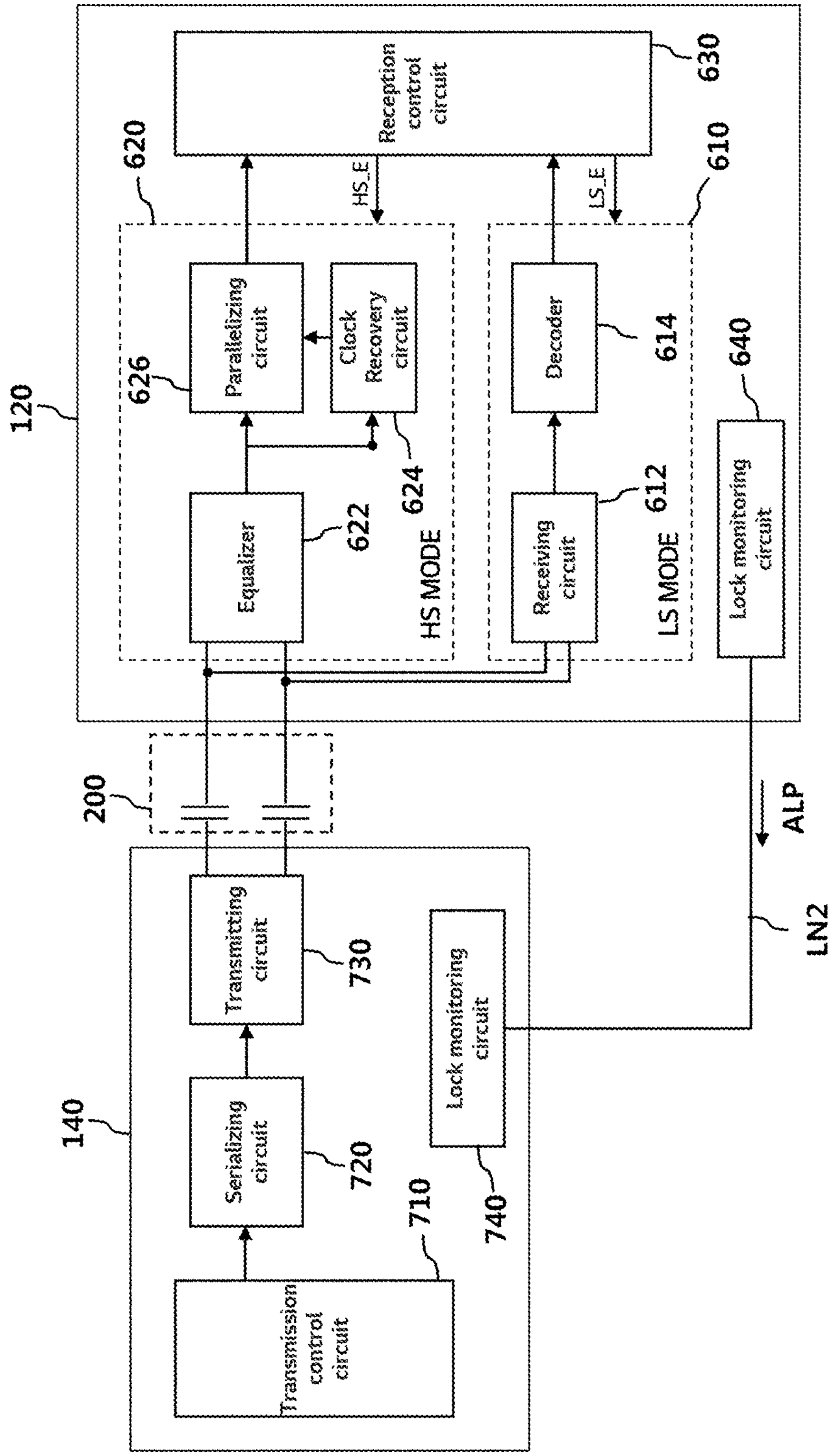
FIG. 6 is a detailed configuration diagram of a data processing device and a data driving device according to an embodiment.

FIG. 6 is a detailed configuration diagram of a data processing device and a data driving device according to an embodiment.

The data driving device 120 may comprise a low-speed communication circuit 610, a high-speed communication circuit 620, a reception control circuit 630, and a lock control circuit 640.

The low-speed communication circuit 610 may perform a low-speed communication with the data processing device 140 through a first communication line (LN1) 200.

The low-speed communication circuit 610 may comprise a receiving circuit 612 and a decoder 614.

The receiving circuit 612 may be connected with the first communication line (LN1) 200 including at least one alternating current coupling capacitor 212, 222.

The receiving circuit 612 may receive a receiving side configuration data signal encoded using the DC balance code through the first communication line (LN1) 200. The receiving side configuration data signal may be transmitted from a transmitting circuit 730 of the data processing device 140.

The receiving circuit 612 may comprise a buffer to temporarily store the receiving side configuration data signal when the receiving circuit 612 receives the same.

The receiving circuit 612 may transmit the receiving side configuration data signal temporarily stored in the buffer to the decoder 614.

Meanwhile, the receiving circuit 612 may receive a preamble signal, which is a low-speed communication clock signal, before receiving the receiving side configuration data signal. The preamble signal may also be encoded using the DC balance code.

In a case when the DC balance code is the Manchester code, the preamble signal may be a signal in which the Manchester code corresponding to either the binary numeral “1” or the binary numeral “0” is repeated N times.

In a case when the DC balance code is the 8B10B code, the preamble signal may be a signal in which data bits corresponding to the binary numeral “1” and data bits corresponding to the binary numeral “0” may regularly appear such that their appearance numbers are balanced with each other.

The decoder 614 may receive the preamble signal from the receiving circuit 612 and train a clock for the low-speed communication. Here, the decoder 614 may receive an internal clock from an internal clock generating circuit (not shown) comprised in the data driving device 120 and may synchronize the internal clock with the preamble signal through a clock training.

Subsequently, the decoder 614 may receive the receiving side configuration data signal from the receiving circuit 612, decode the receiving side configuration data signal using the DC balance code to output receiving side configuration data, and transmit the same to the reception control circuit 630.

Here, since the DC balance code may be either the Manchester code or the 8B10B code, the decoder 614 may comprise either a Manchester decoder or an 8B10B decoder.

The receiving circuit 612 and the decoder 614 may be activated or deactivated by the reception control circuit 630 to be described below.

In other words, when power is applied to the data driving device 120, the receiving circuit 612 and the decoder 614 may be activated by the control of the reception control circuit 630.

When the decoder 614 decodes an end bit or an end symbol of the receiving side configuration data signal or the receiving circuit 612 receives the low-speed protocol signal PS2 in the CFG done section, the receiving circuit 612 and the decoder 614 may be deactivated by the control of the reception control circuit 630.

The high-speed communication circuit 620 may perform a high-speed communication with the data processing device through the first communication line (LN1) 200.

The high-speed communication circuit 620 may comprise an equalizer 622, a clock recovery circuit 624, and a parallelizing circuit 626.

The equalizer 622 may improve the reception performance of the data driving device 120 by compensating for a loss of a high-speed protocol signal PS1 occurring due to a characteristic of the first communication line (LN1) 200.

The clock recovery circuit 624 may train a clock for the high-speed communication to recover a clock from the high-speed protocol signal PS1.

The parallelizing circuit 626 may convert data in series, included in the high-speed protocol signal PS1, into data in parallel using the clock recovered by the clock recovery circuit 624. The data in parallel may be image data corresponding to an image displayed in the display panel 110.

The reception control circuit 630 may control operations of the low-speed communication circuit 610 and the high-speed communication circuit 620.

In other words, when power is applied to the data driving device 120, the reception control circuit 630 may transmit enable information LS_E to the low-speed communication circuit 610 to activate the receiving circuit 612 and the decoder 614.

This may allow a low-speed communication to be performed through the first communication line (LN1) 200.

In addition, the reception control circuit 630 may set up a high-speed communication environment according to the receiving side configuration data outputted from the decoder 614. The reception control circuit 630 may set up the equalizer 622 according to a gain level of the equalizer 622 included in the receiving side configuration data.

Subsequently, the reception control circuit 630 may transmit enable information HS_E to the high-speed communication circuit 620 to activate the equalizer 622, the clock recovery circuit 624, and the parallelizing circuit 626.

This may allow a high-speed communication to be performed through the first communication line (LN1) 200.

According to an embodiment, when transmitting the enable information HS_E to the high-speed communication circuit 620, the reception control circuit 630 may transmit disable information to the low-speed communication circuit 610 to deactivate the low-speed communication circuit 610, that is, the receiving circuit 612 and the decoder 614.

The lock control circuit 640 may generate an auxiliary communication signal ALP of a low level and transmit it to a lock monitoring circuit 740 of the data processing device 140 through the second communication line LN2 before the completion of a clock training in the decoder 614 or the clock recovery circuit 624.

After the completion of the clock training in the decoder 614 or the clock recovery circuit 624, the lock control circuit 640 may generate an auxiliary communication signal ALP of a high level and transmit it to the lock monitoring circuit 740.

The data processing device 140 may comprise a transmission control circuit 710, a serializing circuit 720, the transmitting circuit 730, and the lock monitoring circuit 740.

When power is applied to the data processing device 140, the transmission control circuit 710 may activate the serializing circuit 720, the transmitting circuit 730, and the lock monitoring circuit 740.

The transmission control circuit 710 may generate receiving side configuration data for setting up a high-speed communication environment of the data driving device 120, which is a receiving side. Here, the receiving side configuration data may comprise multiple pieces of configuration data (CFG DATA "1" to CFG DATA "N" in FIG. 5A and FIG. 5B) and the transmission control circuit 710 may generate the receiving side configuration data in a serial form or in a parallel form.

The transmission control circuit 710 may generate a receiving side configuration data signal, which is a low-speed protocol signal PS2 including the receiving side configuration data. Here, the transmission control circuit 710 may encode the receiving side configuration data signal using the DC balance code, which may be either the Manchester code or the 8B10B code.

In a case when generating receiving side configuration data in a parallel form, the transmission control circuit 710 transmits a receiving side configuration data signal encoded using the DC balance code to the serializing circuit 720.

In a case when generating the receiving side configuration data in a serial form, the transmission control circuit 710 may transmit the receiving side configuration data signal to the transmitting circuit 730 without transmitting it to the serializing circuit 720.

After transmitting the receiving side configuration data signal, the transmission control circuit 710 may receive image data from an external device or generate a high-speed protocol signal PS1 including image data. Subsequently, the transmission control circuit 710 may transmit the high-speed protocol signal PS1 to the serializing circuit 720.

Here, the transmission control circuit 710 may encode the high-speed protocol signal PS1 using the 8B10B code or a non-return-to-zero (NRZ) code.

According to an embodiment, the transmission control circuit 710 may generate a preamble signal encoded using the DC balance code before generating the receiving side configuration data signal and transmit the preamble signal to the serializing circuit 720 or the transmitting circuit 730. In other words, the transmission control circuit 710 may generate the preamble signal in a parallel form and transmit it to the serializing circuit 720 or generate the preamble signal in a serial form and transmit it to the transmitting circuit 730.

Here, the preamble signal may be a signal in which the Manchester code corresponding to either the binary numeral "1" or the binary numeral "0" is repeated N (N is a natural number equal to or higher than 2) times or a signal in which data bits, respectively corresponding to a binary numeral "1" and a binary numeral "0", regularly appear such that their appearance numbers are balanced with each other.

The serializing circuit 720 may receive at least one of the receiving side configuration data signal and the high-speed protocol signal PS1 in a parallel form from the transmission control circuit 710 and convert it to have a serial form.

Subsequently, the serializing circuit 720 may transmit the receiving side configuration data signal converted to have a serial form or the high-speed protocol signal PS1 converted to have a seral form to the transmitting circuit 730.

According to an embodiment, the serializing circuit 720 may receive a preamble signal in a parallel form from the transmission control circuit 710 and convert it to have a serial form before receiving the receiving side configuration data signal. The serializing circuit 720 may transmit the preamble signal converted to have a serial form to the transmitting circuit 730.

The transmitting circuit 730 may be connected with the first communication line (LN1) 200 including at least one alternating current coupling capacitor 212, 222.

After receiving the receiving side configuration data signal in a serial form from the transmission control circuit 710 or the serializing circuit 720, the transmitting circuit 730 may transmit the receiving side configuration data signal to the data driving device 120 through the first communication line (LN1) 200 in the low-speed communication. Here, the transmitting circuit 730 may transmit the receiving side configuration data signal in an analog form.

According to an embodiment, the transmitting circuit 730 may receive a preamble signal from the transmission control circuit 710 or the serializing circuit 720 before transmitting the receiving side configuration data signal, transmit the preamble signal to the data driving device 120 through the first communication line (LN1) 200, and then, transmit the receiving side configuration data signal. Here, the transmitting circuit 730 may transmit the preamble signal in an analog form in the low-speed communication.

After completing the transmission of the receiving side configuration data signal, the transmitting circuit 730 may receive the high-speed protocol signal PS1 from the serializing circuit 720 and transmit the high-speed protocol signal PS1 to the data driving device 120 through the first communication line (LN1) 200. Here, the transmitting circuit 730 may transmit the high-speed protocol signal PS1 in an analog form in the high-speed communication.

The lock monitoring circuit 740 may receive an auxiliary communication signal ALP from the lock control circuit 640 of the data driving device 120.

When the auxiliary communication signal ALP received by the lock monitoring circuit 740 in the low-speed communication is changed from a low level to a high level, the transmission control circuit 710 may generate receiving side configuration data.

When the auxiliary communication signal ALP received by the lock monitoring circuit 740 in the high-speed communication is changed from a low-level to a high level, the transmission control circuit 710 may transmit image data to the serializing circuit 720.

As described above, according to an embodiment, since the display device 100 encodes the low-speed protocol signal PS2 using the DC balance code, it is possible to minimize communication errors in the low-speed communication of the display device 100 due to an alternating current coupling capacitor of a communication line.

Hereinafter, a procedure in which the data driving device 120 processes the receiving side configuration data signal will be described.

Figure 7:
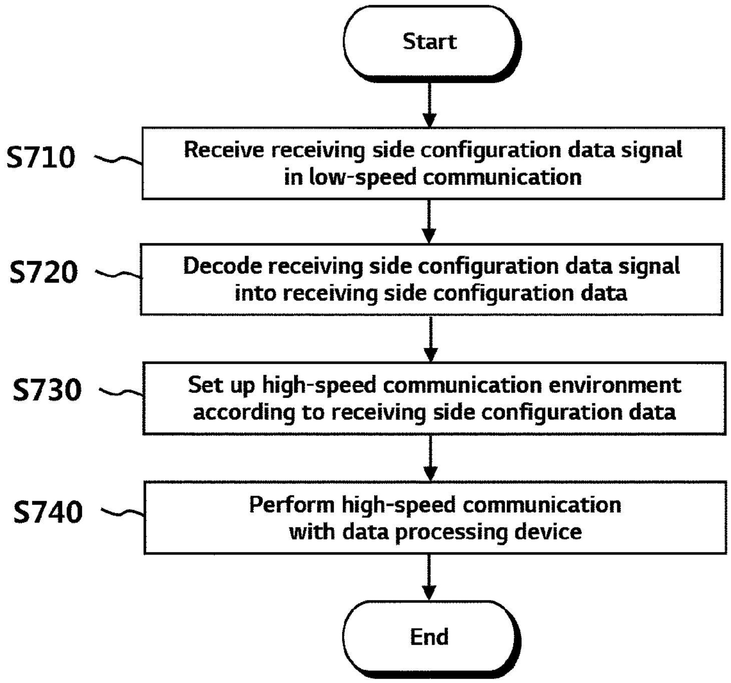
FIG. 7 is a flow diagram showing a procedure of a data driving device processing a receiving side configuration data signal according to an embodiment.
Figure 8A:
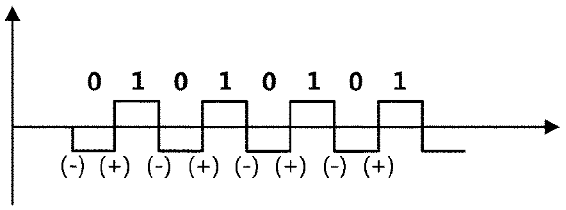
FIG. 8A and FIG. 8B are diagrams illustrating a conventional art.
Figure 8B:
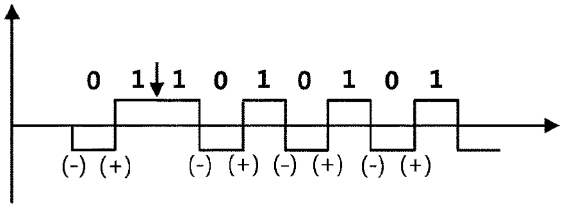

FIG. 7 is a flow diagram showing a procedure of a data driving device's processing a receiving side configuration data signal according to an embodiment.

Referring to FIG. 7, when driving voltages VCC are supplied to the data processing device 140 and the data driving device 120, the data driving device 120 may receive a receiving side configuration data signal encoded using the DC balance code by performing a low-speed communication with the data processing device 140 connected with the data driving device 120 through the first communication line (LN1) 200 (S710).

Subsequently, the data driving device 120 may decode the receiving side configuration data signal into receiving side configuration data using the DC balance code (S720). The receiving side configuration data decoded in the data driving device 120 may have a serial form.

The data driving device 120 may set up a high-speed communication environment according to the receiving side configuration data and perform a high-speed communication with the data processing device 140 through the first communication line (LN1) 200 (S730, S740).

According to an embodiment, the data driving device 120 may receive a preamble signal transmitted from the data processing device 140 through the first communication line (LN1) 200 before performing step S720 and train a clock for the low-speed communication using the preamble signal.

What is claimed is:

1. A method for transmitting data by a first integrated circuit, the method comprising:
- encoding a first protocol signal including configuration data using a direct current (DC) balance code;
- transmitting the encoded first protocol signal including the configuration data, at a first transmission rate, to a second integrated circuit; and
- transmitting a second protocol signal, at a second transmission rate higher than the first transmission rate, to the second integrated circuit,
- wherein the encoded first protocol signal includes a bit or a symbol disposed before and after the configuration data, and
- the configuration data includes data for setting an environment for transmitting the second protocol signal at the second transmission rate.

2. The method of claim 1, wherein the first protocol signal is encoded using a Manchester code of the DC balance code and the encoded first protocol signal includes a start bit disposed before the configuration data and an end bit disposed after the configuration data.

3. The method of claim 1, wherein the first protocol signal is encoded using an 8B10B code of the DC balance code and the encoded first protocol signal includes a start symbol disposed in the configuration data and an end symbol disposed after the configuration data.

4. The method of claim 1, wherein the configuration data includes header data corresponding to information related to the configuration data and checksum data.

5. The method of claim 1, wherein the encoded first protocol signal includes a preamble signal, and
- the preamble signal is transmitted, at the first transmission rate, to the second integrated circuit, before transmitting the configuration data signal.

6. The method of claim 4, wherein the preamble signal comprises at least one of a first data bit corresponding to a binary numeral "1" and a second data bit corresponding to a binary numeral "0" regularly.

7. The method of claim 1, wherein the first protocol signal is transmitted at the first transmission rate through a first communication line, and
- the second protocol signal is transmitted at the second transmission rate higher than the first transmission rate through a second communication line.

8. A method for receiving and identifying data transmitted from a first integrated circuit, in a second integrated circuit, the method comprising:
- receiving a first protocol signal including configuration data transmitted from the first integrated circuit at a first transmission rate,
- decoding the received first protocol signal including the configuration data using a direct current (DC) balance code;
- setting up a communication environment corresponding a second transmission rate higher than the first transmission rate;
- receiving a second protocol signal transmitted from the first integrated circuit at the second transmission rate higher than the first transmission rate; and
- identifying the second protocol signal based on the configuration data,
- wherein the decoded first protocol signal includes a bit or a symbol disposed before and after the configuration data, and
- the configuration data includes data for setting an environment for transmitting the second protocol signal at the second transmission rate.

9. The method of claim 8, wherein the first protocol signal is decoded using a Manchester code of the DC balance code and the decoded first protocol signal includes a start bit disposed before the configuration data and an end bit disposed after the configuration data.

10. The method of claim 8, wherein the first protocol signal is decoded using an 8B10B code of the direct current (DC) balance code and the decoded first protocol signal includes a start symbol disposed in the configuration data and an end symbol disposed after the configuration data.

11. The method of claim 8, wherein the configuration data includes header data corresponding to information related to the configuration data and checksum data.

12. The method of claim 8, wherein the decoded first protocol signal includes a preamble signal, and
- the preamble signal is received, at the first transmission rate, from the first integrated circuit, before receiving the configuration data signal.

13. The method of claim 12, wherein the preamble signal comprises at least one of a first data bit corresponding to a binary numeral "1" and a second data bit corresponding to a binary numeral "0" regularly.

14. The method of claim 8, wherein the first protocol signal is received at the first transmission rate through a first communication line, and
- the second protocol signal is received at the second transmission rate higher than the first transmission rate through a second communication line.

* * * * *